United States Patent [19]

Shimizu et al.

[11] Patent Number: 5,511,133
[45] Date of Patent: Apr. 23, 1996

[54] METHOD AND APPARATUS OF RECOGNIZING A MOVING OBJECT

[75] Inventors: Masako Shimizu; Ken-ichi Tanaka, both of Hyogo, Japan

[73] Assignee: Mitsubishi Denki Kabushiki Kaisha, Tokyo, Japan

[21] Appl. No.: 174,622

[22] Filed: Dec. 28, 1993

Related U.S. Application Data

[63] Continuation of Ser. No. 807,452, Dec. 13, 1991, abandoned.

[30] Foreign Application Priority Data

Jan. 24, 1991 [JP] Japan .................................. 3-022743

[51] Int. Cl.$^6$ ........................................................ G06K 9/62
[52] U.S. Cl. .............................................. 382/156; 395/21
[58] Field of Search ................................. 382/14, 15, 22, 382/41, 155, 156, 157, 158, 199, 276; 395/21, 22, 24, 25

[56] References Cited

U.S. PATENT DOCUMENTS 5,129,040  7/1992  Hamazato et al. .................... 382/14

OTHER PUBLICATIONS

Roth, "Survey of Neural Network Technology for Automatic Target Recognition" IEEE on Neural Networks, Mar. 1990, pp. 28–43.
Marshall, "Self–Organizing Neural Networks for Perception of Visual Motion", Neural Networks, 1990, pp. 45–74.
Seytter, "Self–Organizing Neural Net for Depth Movement Analysis" Parallel Processing in Neural Systems+Computers, 1990, 369–372.
J. Hutchinson et al., "Computing Motion Using Analog and Binary Resistive Networks", 8153 Computer 21 (1988) Mar., No. 3, New York, NY, pp. 52–63.
"Velocity Field Computation Using Neural Networks", Electronics Letters, 26 (1990) 11 Oct., No. 21, Stevenage, Herts, GB, pp. 1787–1790.
T. Roska et al., "Detecting Simple Motion Using Cellular Neural Networks", 1990 IEEE Int'l Workshop on Cellular Neural Networks and Their Applications, Hotel Agro, Budapest, Hungary, Dec. 16–19, 1990, pp. 127–138.
D. H. Ballard et al., "Parallel Visual Computation", Nature, vol. 306, 3 Nov. 1983, pp. 21–26.
T. Carney et al., "Parallel processing of motion and colour information", Nature, vol. 328, 13 Aug. 1987, pp. 647–649.
M. Gori et al., "On the Problem of Local Minima in Backpropagation", IEEE Transactions on Pattern Analysis & Machine Intelligence, vol. 14, No. 1, Jan. 1992, pp. 76–85.
Blake, A. et al., Visual Reconstruction, MIT Press, 1987, pp. 39–50 and 111–129.
Geman, S. et al., "Stochastic Relaxation, Gibbs Distribution, and the Bayesian Restoration of Images", IEEE Transactions on Pattern Analysis, vol. PAMI–6, No. 6, Nov. 1984, pp. 721–741.
Computing Motion Using Analog & Binary Resistive Networks.

*Primary Examiner*—Joseph Mancuso
*Assistant Examiner*—Gerard Del Rosso
*Attorney, Agent, or Firm*—Wolf, Greenfield & Sacks

[57] ABSTRACT

Disclosed is a moving object recognizing system, resistant to noise, which precisely obtains velocities, positions and configurations of an object moving in three-dimensional space. The system employs a bidirectional neural network including velocity neurons, coupled by twos and disposed, for respectively obtaining x-and-y components of an optical flow at respective points of the moving object and also line processes, interposed between the velocity neurons, for taking analog values for detecting edges of the moving object.

43 Claims, 7 Drawing Sheets

IMAGE DATA INPUT TO NEURONS 2a AND 2b

2c: LINE PROCESSES (VALUES RESULTING FROM COMPONENT OF OPTICAL FLOW OF ADJACENT NEURONS)

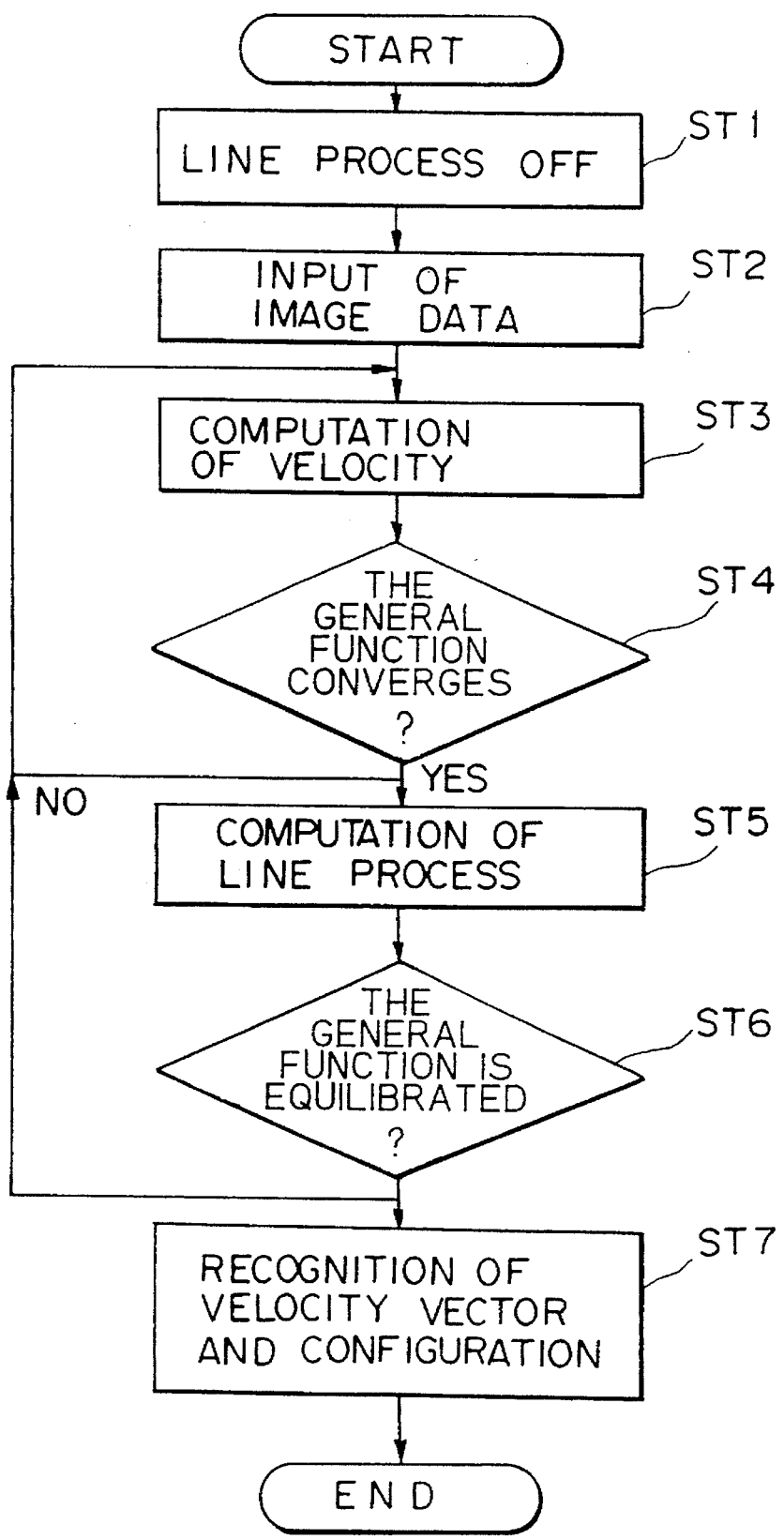

METHOD AND APPARATUS OF RECOGNIZING A MOVING OBJECT

This application is a continuation of application Ser. No. 07/807,452, filed Dec. 13, 1991, now abandoned.

BACKGROUND OF THE INVENTION

1. Field of the Invention

The present invention relates to a moving object recognition system for obtaining velocities, positions and configurations of an object moving in three-dimensional space by using a neural network.

2. Prior Art

The conventional system for recognizing a moving object, as reported in Computing Motion Using Analog and Binary Resistive Networks, by Hutchionson, et al, NIKKEI ELECTRONICS Aug. 8, 1988, pp. 171–185, is actualized by using an analog resistive network in which line processes (which take digital values) for detecting edges (for obtaining a configuration) of the object to be recognized are added to a method of computing an optical flow.

The optical flow is herein defined as a velocity vector at respective points of the object which are computed, when projecting the object moving in the three-dimensional space on a two-dimensional plane, from variations of brightness in terms of time and space at the respective points of a two-dimensional image thereof. This optical flow (u, v) is obtained by minimizing the general function $\epsilon$ shown in the formula (1).

$$\epsilon = \epsilon_1 + \epsilon_2 \quad (1)$$

In this formula (1), $\epsilon_1$ is a condition which should be satisfied by the optical flow to be obtained and is expressed as in the formula (2).

$$\epsilon_1 = \iint (E_x \cdot u + E_y \cdot v + E_t) \, dx dy \quad (2)$$

where $E_x$, $E_y$, $E_t$ are the partial derivatives ($E_x = \partial E/\partial x$, $E_y = \partial E/\partial y$, $E_t = \partial E/\partial t$) of the luminance at the respective points of input image data with respect to x-and-y components and the time, and u, v are the x-and-y components of the optical flow.

Further, in the formula (1), $\epsilon_2$ is the constraint condition under which the velocity vector varies continuously spatially, and smoothly and is expressed as in the formula (3).

$$\epsilon_2 = \iint \left[ \alpha^2(1-l^v) \left\{ \left(\frac{\partial u}{\partial x}\right)^2 + \left(\frac{\partial v}{\partial x}\right)^2 \right\} + \alpha^2(1-l^h) \left\{ \left(\frac{\partial u}{\partial y}\right)^2 + \left(\frac{\partial v}{\partial y}\right)^2 \right\} \right] dx dy \quad (3)$$

where $\alpha$ is the constant which represents an intensity of the constraint condition, the Intensity being increased if the input image data contain a large amount of noise but decreased if the data contain only a small amount of noise.

A velocity field does not, however, become discontinuous, even at the edges of an object whose velocity varies due to the introduction this constraint condition, resulting in a smooth continuity. To obviate this phenomenon, the line processes $l^h$, $l^v$ in horizontal and vertical directions are introduced into the formula (3).

These line processes comprise neurons for detecting the edges of the object to be recognized in the input image data, when the velocity becomes largely discontinuous between two adjacent points. More specifically, when detecting the edges of the object, an output of a line process is set to 1 (ON). If continuous, the output is set to 0 (OFF). A line process which takes a binary value (either 0 or 1) is referred to as a digital line process.

Concretely, as illustrated in FIG. 7, if the velocities at a point (i, j) and a point (i+1, j) adjacent thereto in the x-direction are discontinuous, the line process $l^v$ (the components i, j are shown as suffixes in the Figure) in the vertical direction to the point (i, j) is turned ON. Similarly, when the velocities at the point (i, j) and a point (i, j+1) adjacent thereto in the y-direction are discontinuous, the line process $l^h$ (the components i, j are shown as suffixes in the Figure) in the horizontal direction to the point (i, j) is turned ON.

In the above-described line process, digital values are employed. Consequently, when the velocity is discontinuous, the first or second term of an integrand of the general function $\epsilon_2$ is eliminated, and the general function $\epsilon$ approximates the minimal value as closely as possible.

Next, the operation of the prior art system described above will be explained with reference to the flowchart of FIG. 8.

To start with, all the line processes of the neural network are turned OFF (step ST1). The input image data are inputted as input values (step ST2). Then, where the line processes are in an OFF-status, the computations of the velocity vectors are repeated until the first term $\epsilon_1$ of the general function $\epsilon$ in the formula (1) is substantially converged (steps ST3, ST4). Namely, the output values of the foregoing neural network are converged. Thereafter, the status of each line process is determined depending on whether the second term $\epsilon_2$ of the aforementioned general function $\epsilon$ in the formula (1) is reduced by turning ON or OFF each line process (step ST5). This process is repeated (step ST6), whereby the general function $\epsilon$ is made approximate to the minimal value (equilbrated). The velocity vectors and configurations of the object making motions in the three-dimensional space are thus recognized (step ST7).

One problem of the prior art system for recognizing a moving object, is that a local minimum may result during the computation. Also, in some cases no correct answer can be obtained due to the behavior of the line processes which take the digital values. Once the line process is turned ON, the velocity vector and the configuration are established. If those results are incorrect, no correct result can be drawn by repeating the computation from that moment onward. An additional problem is the difficulty in timing the turning ON of the line process.

It is an object of the present invention, which has been devised to obviate the problems given above, to obtain a moving object recognizing system capable of recognizing velocities, positions and configurations of an object moving in three-dimensional space and which is also resistant to noise.

SUMMARY OF THE INVENTION

To accomplish this object, according to one aspect of the present invention, there is provided a system for recognizing a moving object involving the use of a bidirectional neural network including a plurality of velocity neurons, coupled in pairs, each pair disposed to obtain x-and-y components of an optical flow at respective points on a two-dimensional projected image of a moving object, and also the use of line processes for taking analog values as line process elements interposed between the velocity neurons.

According to the moving object recognizing system of this invention, the velocity neurons, which respectively obtain the x-and-y components of the optical flow at the respective points on the two-dimensional projected image of the moving object, change the individual statuses of the line processes for taking the analog values in accordance with dynamics. It is therefore unnecessary to consider a timing for setting the line process. Moreover, there is little possibility of causing a local minimum during the computation, thereby enabling a more accurate recognition of the velocities and configurations of the moving object.

BRIEF DESCRIPTION OF THE DRAWINGS

Other objects and advantages of the present invention will become apparent during the following discussion taken in conjunction with the accompanying drawings, in which:

FIG. 8 is a flowchart describing the operation of the conventional moving object recognizing system.

DETAILED DESCRIPTION OF THE PREFERRED EMBODIMENTS

Figure 1A:
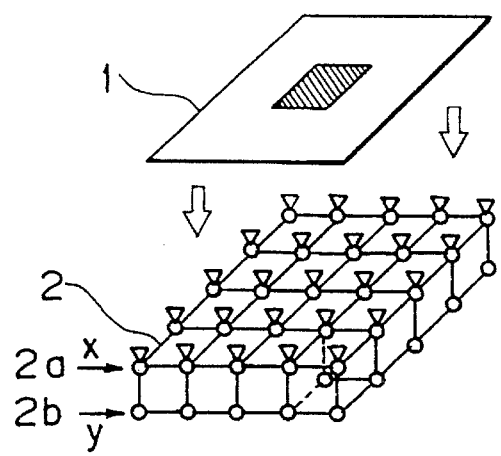
FIG. 1 is a diagram illustrating a construction of a bidirectional neural network according to the present invention.
Figure 1B:
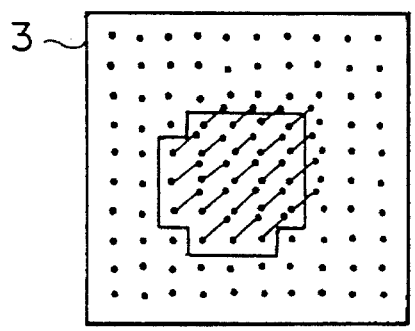
Figure 1C:
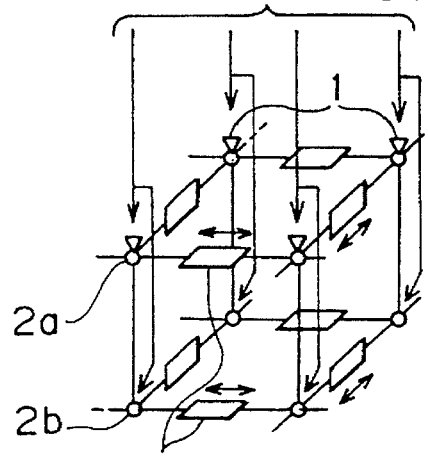

One embodiment of the present invention will hereinafter be described with reference to the drawings. FIG. 1 is a view illustrating a construction of a bidirectional neural network for actualizing a system for recognizing a moving object in one embodiment of this invention. Designated at 1 in FIG. 1(a) is input image data on a moving object moving in three-dimensional space which is projected on a two-dimensional plane. The numeral 2 represents the bidirectional neural network composed of a layer of x-directional velocity neurons 2a for obtaining x-components of an optical flow of the moving object and a layer of y-directional velocity neurons 2b for obtaining y-components thereof. Line processes 2c, which take values from 0 to 1 and are disposed on each layer, are, as illustrated in FIG. 1(b), interposed mutually between the velocity neurons. Indicated at 3 is an output result given from the bidirectional neural network 2.

Herein, each x-directional velocity neuron 2a, when inputting the input image data 1, changes its own status in conformity with the dynamics expressed by the following formulae till the bidirectional neural network 2 reaches an equilibrium (the general function ε shown in the above-mentioned formula (1) becomes the minimal value).

$$\dot{u}_{i,j} = -\beta \frac{\partial \varepsilon}{\partial u_{i,j}} \tag{4}$$

$$\frac{\partial \varepsilon}{\partial u_{i,j}} = E_{xi,j}(E_{xi,j}U_{i,j} + E_{yi,j}V_{i,j} + E_{ti,j}) + \tag{5}$$

$$\alpha^2 \{(1 - l^v_{i,j})(u_{i+1,j} - u_{i,j}) - (1 - l^v_{i-1,j})(u_{i,j} - u_{i-1,j}) +$$

$$(1 - l^h_{i,j})(u_{i,j+1} - u_{i,j}) - (1 - l^h_{i,j-1})(u_{i,j} - u_{i,j-1})\}$$

In these formulae (4) and (5), $u_{i,j}$, $v_{i,j}$ are the x-component (an output of x-directional velocity neuron 2a) and the y-component (an output of the y-directional velocity neuron 2b) of the optical flow at the point (i, j), and β is the constant. In the y-directional velocity neuron 2b also, the status is likewise varied in accordance with the dynamics expressed with respect to $v_{i,j}$.

Figure 7:
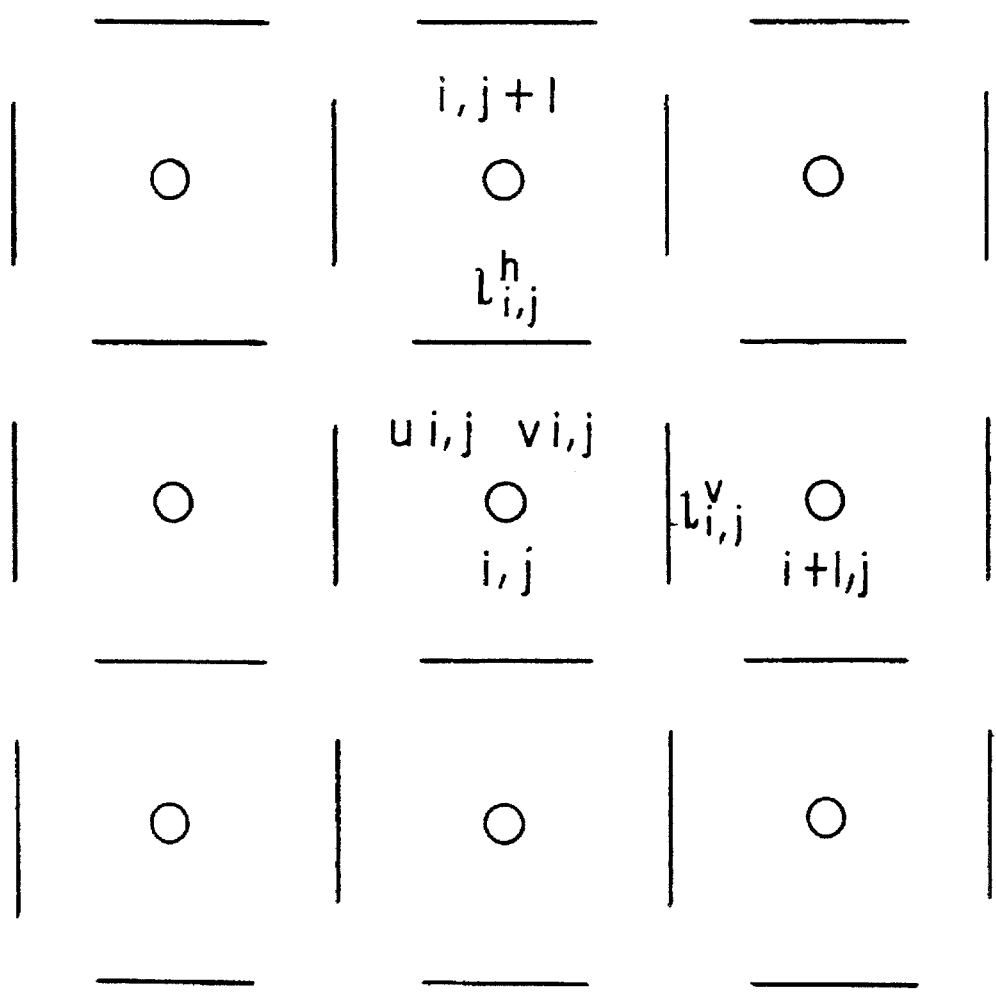
FIG. 7 is a diagram illustrating a geometry between velocity neurons containing line processes.

A line process $l^h$ (i, j are shown as suffixes in the formula as in FIG. 7) in the horizontal direction at the point (i, j) changes an output value in accordance with the dynamics shown in the following formulae.

$$l^h_{i,j} = V(m_{i,j}) \tag{6}$$

$$\dot{m}_{i,j} = -\gamma m_{i,j} + C_m |(u^2_{i,j+1} + v^2_{i,j+1}) - (u^2_{i,j} + v^2_{i,j})| - \tag{7}$$

$$C_{nl}\left(\sum_{k=1}^{nl} V(m_{i,j\pm k})\right) m_{i,j} - C_c \{V(n_{i,j+1})V(m_{i+1,j}) +$$

$$V(n_{i,j})V(m_{i+1,j}) + V(n_{i,j+1})V(n_{i,j}) + V(n_{i-1,j+1})V(m_{i-1,j}) +$$

$$V(n_{i-1,j+1})V(n_{i-1,j}) + V(m_{i-1,j})V(n_{i,j})\} m_{i,j}$$

In these formulae (6) and (7), γ, $C_m$, $C_{nl}$, $C_c$, nl are the constants; $m_{i,j}$, $n_{i,j}$ are the internal statuses of the line processes $l^h$, $l^v$ in the horizontal and vertical directions at the point (i, j); and the function V is, as expressed in the formula (8), a sigmoid function (a is the constant).

$$V(x) = \frac{2}{1 + e^{-ax^2}} - 1 \tag{8}$$

Similarly, an expression is given as shown in the formula (7) with respect to the line process $l^v$ in the vertical direction. The statuses of the line processes and the velocity neurons are changed on the basis of the dynamics described above. The outputs, when the bidirectional neural network 2 reaches the equilibrium, are taken out, thereby obtaining the optical flow.

Figure 2:
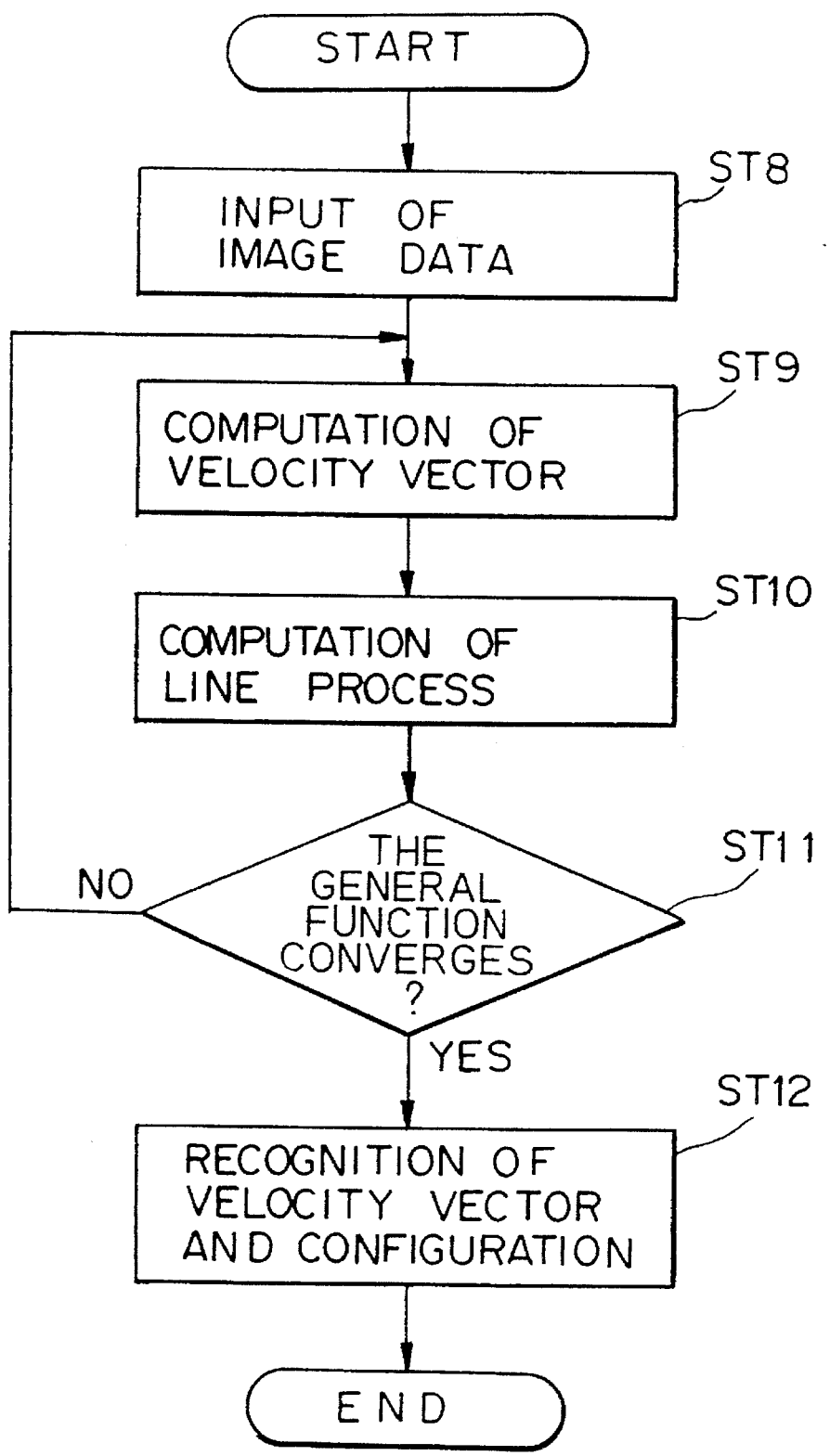
FIG. 2 is a flowchart describing the operation of a system for recognizing a moving object in one embodiment of this invention.

The operation will be next explained with reference to a flowchart of FIG. 2.

When the input image data 1 are inputted as input values to the bidirectional neural network 2 (step ST8), the x-directional velocity neurons 2a compute the x-components of the optical flow on the basis of the formula (4). Similarly, the y-directional velocity neurons 2b compute the y-components of the optical flow (step ST9). The respective line processes 2c are computed based on the formula (7) (step ST10). The statuses continue to be changed until the general function ε in the formula (1) converges (step ST11). Velocity vectors and configurations of the moving object are obtained from the outputs of the bidirectional neural network 2 when the general functional ε converges (step ST12).

Figure 3:
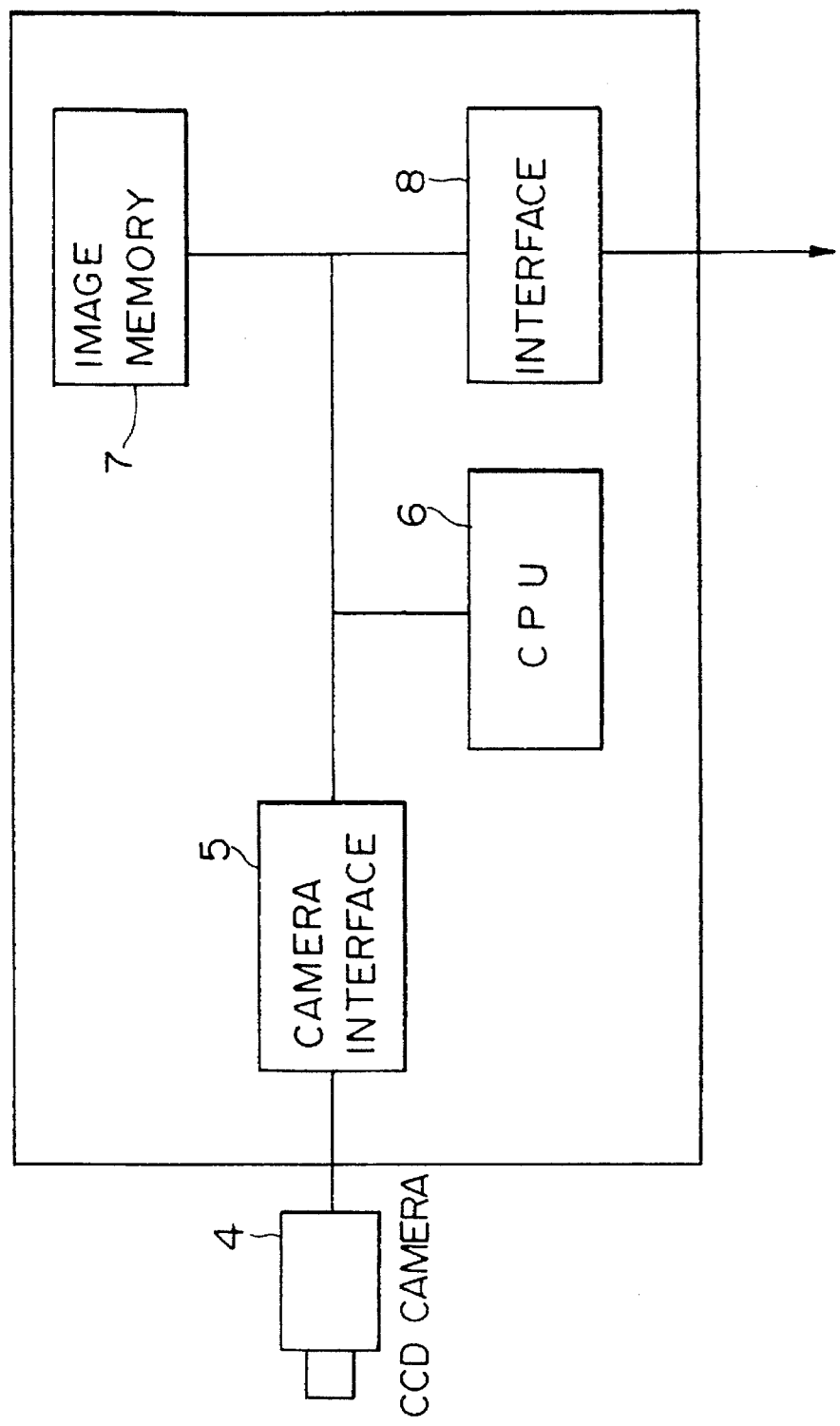
FIG. 3 is a block diagram depicting a construction of a visual processor for actualizing the moving object recognizing system in one embodiment of this invention.

This is attainable concretely by a visual processor depicted in FIG. 3.

Referring to FIG. 3, the numeral 4 denotes a CCD camera for taking in the input image data; 5 a camera interface; 6 an image memory for storing the input image data taken in by the CCD camera 4; and an interface for outputting the results obtained by the CPU 6 to the outside.

Figure 4A:
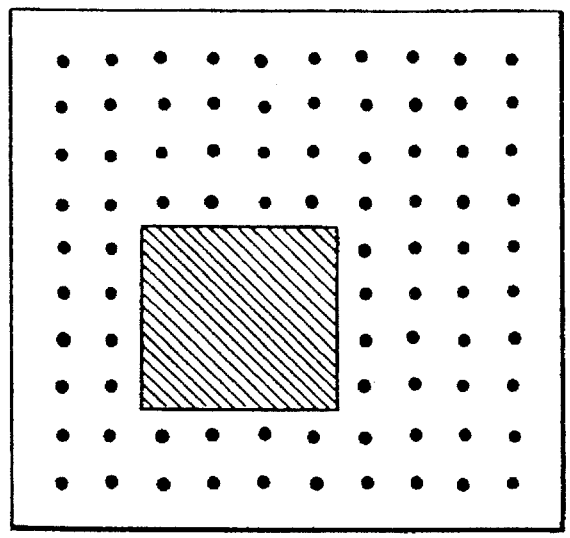
FIG. 4 is a view showing one example of input image data of the moving object.
Figure 4B:
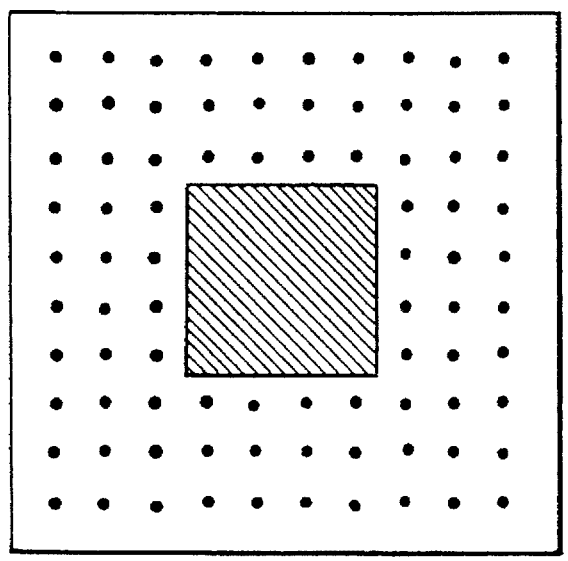

The following example provides an explanation of results of obtaining the optical flow when a square plate illustrated in FIG. 4(a) is moved in a diagonal direction (FIG. 4(b)).

Incidentally, it is assumed for this example that a size of the bidirectional neural network 2 is set to 10×10, and noises are added to the input image data 1.

Figure 5:
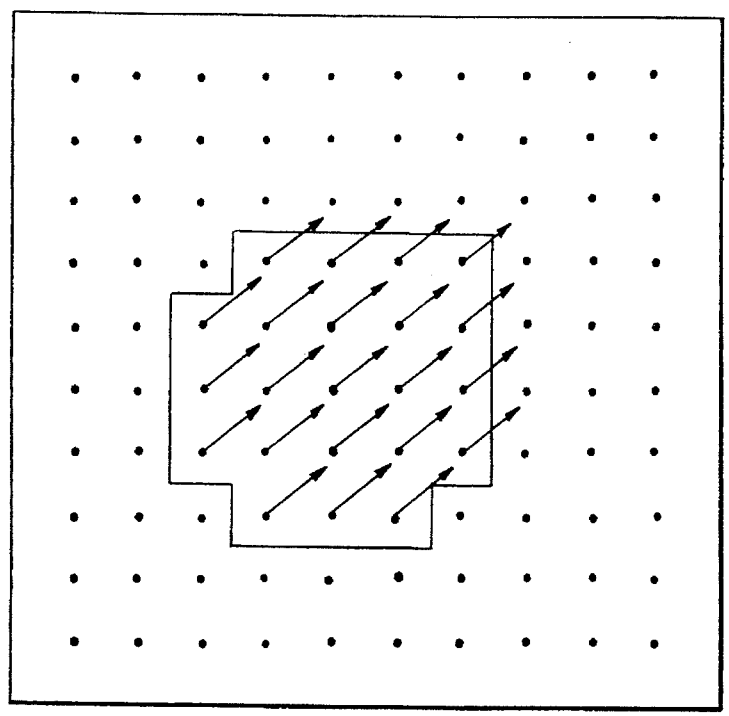
FIG. 5 is a diagram showing a processed result obtained by the moving object recognizing system in one embodiment of this invention.
Figure 6:
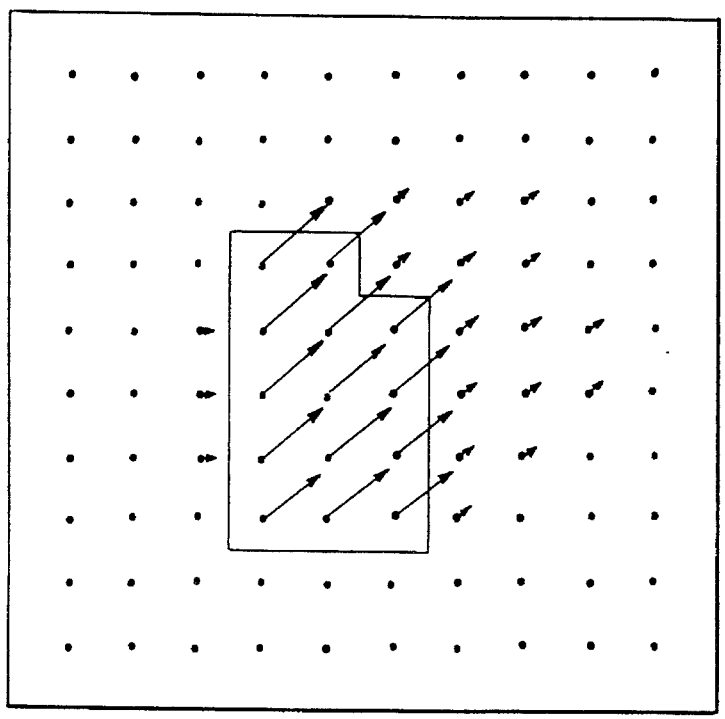
FIG. 6 is a diagram showing a processed result obtained by a conventional moving object recognizing system.

FIG. 5 shows the result obtained in this case. Note that an arrowhead in the Figure indicates an optical flow, while a rectangle represents a configuration of the object which is extracted by the line processes 2c. FIG. 6 shows the result obtained by the conventional moving object recognizing system. As is obvious from the Figure, the configuration of the object is approximate to a square according to the present invention, wherein the correct velocity vectors are computed. Based on the conventional system, in contrast, it can be observed that the object configuration is incomplete, and incorrect minute velocity vectors are produced around the edges due to the influence of noise.

As discussed above, the present invention involves the use of a bidirectional neural network including a plurality of coupled velocity neurons disposed for respectively obtaining the x-and-y directions of the optical flow at the individual points of a moving object. The line processes for taking the analog values are interposed between the respective velocity neurons. This arrangement results in advantages such that the object configuration is more approximate to the original than in the prior arts, and further correct velocity vectors can be obtained.

The foregoing description is merely illustrative and not limiting, has been given by way of example only. Various changes of the embodiment may be effected without departing from the scope of the present invention. For instance, the function of the line process is not limited to the sigmold function, and fast convergence arithmetic operations similar thereto are usable. The CPU 6 may involve the use of an ordinary yon Neumann type or multiprocessor type parallel processing system and parallel computer. Particularly, a so-called hyperparallel computer is desirable. Moreover, the respondence characteristics of the respective neurons and the processes may be configured as disclosed in the present invention by employing the neural network of the resistive coupling network type shown in the treatise of J. Hutchison, et al.

What is claimed is:

1. A method for recognizing a moving three-dimensional object and for computing a description of motion of the object, said method comprising the steps of:

detecting a physical property of the object to produce two-dimensional input image data;

applying the input image data to a bi-directional neural network comprising (I) pairs of velocity neurons for respectively obtaining x-and-y components of said optical flow and (ii) edge detecting line processes, each taking a value from a range between a high value and a low value in accordance with a function of the x and y components of optical flow and which is continuous within said range, interposed between said pairs of velocity neurons; and obtaining an optical flow at respective points of said object based on the values taken by the line processes which optical flow provides the description of the motion of the object.

2. The method as set forth in claim 1, wherein said line process takes a value in accordance with a sigmoid function.

3. An apparatus for recognizing a moving object, comprising:

means for detecting a physical property of the object to produce a two-dimensional image;

means, connected to said means for projecting, for sampling the two-dimensional image at a plurality of points;

a bidirectional neural network, having an input connected to said sampling means, and including velocity neurons for obtaining X-components of an optical flow at the respective points from the sampling data at the respective points, and velocity neurons for obtaining Y-components of said optical flow at the respective points from the sampling data at the respective points;

first line process means, connected between said velocity neurons for obtaining said X-components, for detecting edges of said two-dimensional image and taking a value from a range between a low value and a high value according to a function of the X-components and which is continuous in the range; and second line process means, connected between said velocity neurons for obtaining said Y-components, for detecting the edges of said two-dimensional image and taking a value from a range between a low value and a high value according to a function of the Y-components and which is continuous in the range.

4. The apparatus as set forth in claim 3, wherein both said line process means include means for taking values according to a signmid function.

5. The apparatus as set forth in claim 3 or 4, wherein said velocity neurons and said line process means are contained in a parallel computer system.

6. An apparatus for recognizing a moving three-dimensional object, comprising:

means for detecting a physical property of the object to produce a two-dimensional image of the object wherein the image comprises sample data taken at a plurality of points in a two-dimensional plane;

a bi-directional neural network connected to receive said sample data and including, for each point in the sample data, an X-component velocity neuron for obtaining an X-component of an optical flow at the point, and a Y-component velocity neuron, coupled to the X-component velocity neuron, for obtaining a Y-component of an optical flow at the point, and first line process means, connected between said X-component velocity neurons for detecting edges of said two-dimensional image and taking a value from a range between a low value and a high value according to a function of the X-component and which is continuous within the range; and second line process means, connected between said Y-component velocity neurons for detecting the edges of said two-dimensional image and taking a value from a range between a low value and a high value according to a function of the Y-component and which is continuous within the range.

7. The apparatus as set forth in claim 6, wherein both said line process means include means for taking values according to a sigmoid function.

8. The apparatus as set forth in claim 6 or 7, wherein said velocity neurons and said line process means are contained in a parallel computer system.

9. A method for recognizing a three-dimensional moving object comprising the steps of:

detecting a physical property of the object to produce two-dimensional image data of the object, the data being comprised of a plurality of points;

determining an optical flow from the image data by using a bi-directional neural network including, for each point, an X-component velocity neuron for obtaining an X-component of an optical flow at the point, and a Y-component velocity neuron, for obtaining a Y-component of an optical flow at the point, and detecting edges of the image data using line processes, each taking a value from a range between a low value and a high value according to a function of the x and y components and which is continuous within the range, said line processes being interposed between a plurality of velocity neurons.

10. An apparatus for recognizing a moving three-dimensional object comprising:

a camera interface for receiving a signal from a CCD camera providing a two-dimensional representation of the three-dimensional object;

an image memory for storing the two-dimensional representation; and a central processing unit including means defining a bidirectional neural network including:

velocity neurons for obtaining X components of an optical flow from corresponding points in the two-dimensional representation, velocity neurons for obtaining Y components of said optical flow from corresponding points in the two-dimensional representation, and line processes connected between the velocity neurons for obtaining the X components, for detecting edges of the two-dimensional image and each having a value taken from a range between a low value and a high value according to a function of the x components of the optical flow and which is continuous within the range.

11. The apparatus as set forth in claim 10, wherein both said line process means include means for taking values according to a sigmoid function.

12. The apparatus as set forth in claim 10, wherein said velocity neurons and said line process means are contained in a parallel computer system which also contains the camera interface, the image memory and the central processing unit.

13. The apparatus as set forth in claim 11, wherein said velocity neurons and said line process means are contained in a parallel computer system which also contains the camera interface, the image memory and the central processing unit.

14. The method of claim 2, wherein the sigmoid function is downwardly convex and symmetrical with respect to the Y axis and is continuous, and nonmonotonic.

15. The method of claim 14, wherein the function of the first line process means is $$V(x) = \frac{2}{1 + e^{-ax^2}} - 1,$$

wherein V (x) is the value taken by the line process, a is a constant and x is an input to the line process.

16. The method as set forth in claim 1, wherein said velocity neurons and said line process means are defined in a parallel computer system.

17. The apparatus of claim 4, wherein the sigmoid function is a continuous nonmonotonic function that is downwardly convex and symmetrical with respect to the Y axis.

18. The apparatus of claim 17, wherein the function of the first line process means is represented by the relationship $$V(x) = \frac{2}{1 + e^{-ax^2}} - 1,$$

wherein V (x) is the value taken by the line process, a is a constant and x is an input to the line process.

19. The apparatus of claim 7, wherein the sigmoid function is a continuous nonmonotonic function that in downwardly convex and symmetrical with respect to the Y axis.

20. The apparatus of claim 19, wherein the function of the first line process means is represented by the relationship $$V(x) = \frac{2}{1 + e^{-ax^2}} - 1,$$

wherein V (x) is the value taken by the line process, a is a constant and x is an input to the line process.

21. The method as set forth in claim 9, wherein said line process takes a value in accordance with a sigmoid function.

22. The method of claim 21, wherein the sigmoid function is downwardly convex and symmetrical with respect to the Y axis and is continuous, and nonmonotonic.

23. The method of claim 22, wherein the function of the first line process means is $$V(x) = \frac{2}{1 + e^{-ax^2}} - 1,$$

wherein V (x) is the value taken by the line process, a is a constant and x is an input to the line process.

24. The method as set forth in claim 9, wherein said velocity neurons and said line process means are defined in a parallel computer system.

25. The apparatus of claim 11, wherein the sigmoid function is a continuous and nonmonotonic function that is downwardly convex and symmetrical with respect to the Y axis.

26. The apparatus of claim 25, wherein the function of the first line process means is represented by the relationship $$V(x) = \frac{2}{1 + e^{-ax^2}} - 1,$$

wherein V (x) is the value taken by the line process, a is a constant and x is an input to the line process.

27. A method for determining optical flow of an object using a bidirectional neural network that is described by a general function, comprising the steps of:

detecting a physical property of the object to produce image data:

applying the image data to the bidirectional neural network:

computing velocity vectors from the image data;

computing statuses of line processes, as a function of the computed velocity vectors, of the bidirectional neural network;

determining whether the general function converges; and when the general function does not converge, repeating both of the steps of computing and the step of determining, otherwise providing the velocity vectors and status of line processes as a description of the motion of the object.

28. The method of claim 27, wherein the velocity vectors are determined according to the following equation:

$$u_{i,j} = -\beta \{E_{xi,j}(E_{xi,j}U_{i,j} + E_{yi,j}V_{i,j} + E_{xi,j}) +$$

$$\alpha^2 \{(1 - l^v_{i,j})(u_{i+1,j} - u_{i,j}) - (1 - l^v_{i-1,j})(u_{i,j} - u_{i-1,j}) +$$

$$(1 - l^h_{i,j})(u_{i,j+1} - u_{i,j}) - (1 - l^h_{i,j-1})(u_{i,j} - u_{i,j-1})\}\}$$

wherein $u_{i,j}$ and $v_{i,j}$ are the x component and y component respectively and $l_{i,j}^h$ and $l_{i,j-1}^v$ are the statuses of the line process in the horizontal and vertical directions respectively of the point i,j.

29. The method of claim 27, wherein a line process $l_{i,j}$ has a status according to a function of its internal status $m_{i,j}$ defined by $$m_{i,j} = -\gamma m_{i,j} + C_m |(u_{i,j+1}^2 + v_{i,j+1}^2) - (u_{i,j}^2 + v_{i,j}^2)| -$$

$$C_{nl} \left( \sum_{k=1}^{nl} V(m_{i,j+k}) \right) m_{i,j} - C_c \{V(n_{i,j+1})V(m_{i+1,j}) +$$

$$V(n_{i,j})V(m_{i+1,j}) + V(n_{i,j+1})V(n_{i,j}) + V(n_{i-1,j+1})V(m_{i-1,j}) +$$

$$V(n_{i-1,j+1})V(n_{i-1,j}) + V(m_{i-1,j})V(n_{i-1,j})\} m_{i,j}$$

wherein $\gamma$, $C_m$, $C_{nl}$ and nl are constants, $m_{i,j}$ and $n_{i,j}$ are internal statuses of a line process in the horizontal and vertical directions at a point i, j, and V is the function of the line processes.

30. A bidirectional neural network, comprising:
  a first set of velocity neurons, each for determining a component of flow in a first dimension of two-dimensional data;
  a second set of velocity neurons, each for determining a component of said flow in a second dimension of the two-dimensional data;
  line processes, each connected between two velocity neurons of the first set, for detecting edges of the two-dimensional image in the first dimension and each having a value taken from a first range between a low value and a high value according to a function of the components of the flow obtained by the velocity neurons, which function is continuous within the first range; and
  line processes connected between the velocity neurons of the second set, for detecting edges of the two-dimensional image in the second dimension and each having a value taken from a second range between a low value and a high value according to a function of the components of the flow obtained by the velocity neurons, which function is continuous within the second range.

31. A method for determining a measure of flow in two-dimensional data of an object by using a bidirectional neural network, the bidirectional neural network having a general function and comprising a first set of velocity neurons adapted to determine a component of the flow in a first dimension, a second set of velocity neurons adapted to determine a component of the flow in a second dimension and line process elements, each connected between a pair of elements in one of the first and second dimensions and having a status determined according to a function of the components of the flow determined by the velocity neurons and which is continuous within a range between a high value and a low value, the method comprising the steps of:

detecting a physical property of the object to produce image data;
  applying said image data to the velocity neurons to obtain velocity vectors;
  establishing the statuses of the line processes;
  evaluating the general function of the bidirectional neural network; and
  when the general function converges, obtaining the measure of the flow from the established statuses of the line processes.

32. The method of claim 1, wherein the step of detecting a physical property of the object includes detecting visual characteristics of the object.

33. The method of claim 32, wherein the step of detecting visual characteristics of the object includes detecting the visual characteristics with a camera.

34. The apparatus of claim 3, wherein the means for detecting a physical property of the object includes means for detecting visual characteristics of the object.

35. The apparatus of claim 34, wherein the means for detecting visual characteristics includes a camera.

36. The apparatus of claim 6, wherein the means for detecting a physical property of the object includes means for detecting visual characteristics of the object.

37. The apparatus of claim 36, wherein the means for detecting visual characteristics includes a camera.

38. The method of claim 9, wherein the step of detecting a physical property of the object includes detecting visual characteristics of the object.

39. The method of claim 38, wherein the step of detecting visual characteristics of the object includes detecting the visual characteristics with a camera.

40. The method of claim 27, wherein the step of detecting a physical property of the object includes detecting visual characteristics of the object.

41. The method of claim 40, wherein the step of detecting visual characteristics of the object includes detecting the visual characteristics with a camera.

42. The method of claim 31, wherein the step of detecting a physical property of the object includes detecting visual characteristics of the object.

43. The method of claim 42, wherein the step of detecting visual characteristics of the object includes detecting the visual characteristics with a camera.

* * * * *

UNITED STATES PATENT AND TRADEMARK OFFICE
CERTIFICATE OF CORRECTION

PATENT NO. : 5,511,133
DATED : April 23, 1996
INVENTOR(S) : Masako Shimizu and Ken-ichi Tanaka It is certified that error appears in the above-indentified patent and that said Letters Patent is hereby corrected as shown below:

Column 5, line 29 change "yon" to -- von --.

Signed and Sealed this

Seventh Day of January, 1997

Attest:

BRUCE LEHMAN

*Attesting Officer*           *Commissioner of Patents and Trademarks*